United States Patent [19]
Nelson et al.

[11] Patent Number: 4,771,742
[45] Date of Patent: Sep. 20, 1988

[54] METHOD FOR CONTINUOUS CAMLOBE PHASING

[75] Inventors: Michael T. Nelson, Greenville; Alvon C. Elrod, Clemson, both of S.C.

[73] Assignee: Clemson University, Clemson, S.C.

[21] Appl. No.: 4,334

[22] Filed: Jan. 15, 1987

Related U.S. Application Data

[63] Continuation-in-part of Ser. No. 831,146, Feb. 19, 1986.

[51] Int. Cl.⁴ .............................................. F01L 1/34
[52] U.S. Cl. ................................ 123/90.17; 123/90.15
[58] Field of Search ................. 123/90.6, 90.17, 90.15, 123/90.22, 90.23

[56] References Cited

U.S. PATENT DOCUMENTS

| | | | |
|---|---|---|---|
| 733,220 | 7/1903 | Krebs | 123/90.17 |
| 862,448 | 8/1907 | Cornilleau | 123/90.17 |
| 1,527,456 | 2/1925 | Woydt et al. | 123/90.17 |
| 1,815,134 | 7/1931 | Weiner et al. | 123/90.6 |
| 2,888,837 | 6/1959 | Hellmann | 123/90.17 |
| 3,633,555 | 1/1972 | Raggi | 123/90.17 |
| 4,332,222 | 6/1982 | Papez | 123/90.17 |
| 4,357,917 | 11/1982 | Aoyama . | |
| 4,561,390 | 12/1985 | Nakamura et al. . | |
| 4,570,581 | 2/1986 | Titolo . | |
| 4,572,118 | 2/1986 | Baguena | 123/90.16 |
| 4,577,598 | 3/1986 | Ma . | |
| 4,587,934 | 5/1986 | Moores . | |

FOREIGN PATENT DOCUMENTS

| | | | |
|---|---|---|---|
| 1924114 | 11/1970 | Fed. Rep. of Germany | 123/90.6 |
| 2921645 | 12/1980 | Fed. Rep. of Germany | 123/90.17 |
| 3212663 | 10/1983 | Fed. Rep. of Germany | 123/90.17 |
| 3234640 | 3/1984 | Fed. Rep. of Germany | 123/90.6 |
| 704575 | 2/1941 | Fed. Rep. of Germany | 123/90.17 |
| 727987 | 10/1942 | Fed. Rep. of Germany . | |
| 1109790 | 2/1956 | France | 123/90.17 |
| 1109790 | 2/1956 | France | 123/90.17 |
| 2066361 | 7/1981 | United Kingdom | 123/90.17 |
| 2165885 | 4/1986 | United Kingdom | 123/90.17 |

OTHER PUBLICATIONS

Stone et al, "Variable Valve Timing for IC Engines", Automotive Engineer, vol. 10, No. 4, pp. 54–58, Aug.–Sep. 1983.

Scott, D., "Variable Valve Timing Has Electronic Control", Automotive Engineering, vol. 92, No. 5, pp. 86–87, May 1984.

"Cam Shaft Shifter Cuts Fuel Use", Machine Design, Feb. 6, 1986, p. 46.

Yamaguichi, J., "International Viewpoints", Automotive Engineering, pp. 97–99, vol. 92, No. 1, Jan. 1984.

Primary Examiner—Charles J. Myhre
Assistant Examiner—David A. Okonsky
Attorney, Agent, or Firm—Dority & Manning

[57] ABSTRACT

A method of attaining a desired engine performance comprises the steps of changing the angular position of a variable camlobe (or cam) member relative to a fixed camlobe (or cam) member from a first angular position to a second angular position. In changing from the first to the second angular position, the variable camlobe (or cam) member moves in a predetermined direction relative to the direction of rotation of a camshaft. The predetermined direction and the magnitude of the angular movement of the variable camlobe (or cam) member is dependent at least in part upon at least one desired operating condition of the engine. The method further comprises changing the angular position of both camlobe (or cam) members relative to a reference point of a drive pulley. This change in the angular position of both of the camlobe (or cam) members relative to the reference point involves movement of the camlobes (or cams) in a direction relative to the direction of rotation of a camshaft. The direction and magnitude of this movement is based at least in part upon at least one desired operating condition of the engine.

12 Claims, 6 Drawing Sheets

METHOD FOR CONTINUOUS CAMLOBE PHASING

This application is a continuation-in-part application to U.S. application Ser. No. 831,146, which was filed on Feb. 19, 1986.

BACKGROUND OF THE INVENTION

The present invention relates to internal combustion engines and in particular to an apparatus and method for varying the valve timing pertaining to a combustion chamber thereof.

As known in the art, the "dwell" of a valve is the portion of the camshaft rotation cycle during which the valve is open. As further known in the art, the opening and closing of a valve are referred to as the valve events. The dwell occurs between these two valve events. The events of a rotation cycle can be defined in terms of engine crankshaft degrees. Accordingly, the valve events occur at particular angles, and the dwell can be defined as an angle extending between the two valve events. In an engine with dual camshafts, one camshaft actuates the intake valves, and the other camshaft actuates the exhaust valves. However, in a single-camshaft engine, both intake and exhaust valves are actuated by the single camshaft.

The sequence of the valve events which defines the period during which the intake and exhaust valves are both open determines what is known in the art as the "valve overlap period," also spoken of in terms of a "valve overlap angle." Specifically, the valve overlap period is the period between when the intake valve opens and the exhaust valve closes. In other words, the portion of an engine revolution from the opening of the intake valve to the closing of the exhaust valve is known as the valve overlap angle.

Improvements in power output, economy, and emissions of spark-ignition engines are obtained by variable valve timing which involves changing the timing of one or more of the intake and exhaust valve events. Variable valve timing also provides benefits for diesel engines, including: improved starting, the use of a lower compression ratio, reduction in diesel "knock," the ability to use lower quality fuels, a raising and flattening of the torque curve, improved fuel consumption, reduced emissions, and better control of scavenging in turbocharged engines.

The induction and exhaust systems of internal combustion engines are designed specifically for the type of operation that the engine is expected to perform. An important function in these systems is accomplished with the intake and exhaust valves, since cyclically opening and closing these valves allows for four-stroke operation. The timing of valve actuation is accomplished with one or more camshafts and is determined by the angular relationship between the camshaft(s) and crankshaft. This timing is critical for proper breathing characteristics, but is fixed at what is considered optimum for the expected utilization of the engine. Because of the inertia effects of the gases being inducted into and expelled from the cylinders, the valve timing is considerably different for the various classes of engines. For example, the family automobile has valve timing optimized for ordinary highway operation, and at other speeds the engine performance is less than ideal. The current technology of fixed-valve timing allows for a simple, rigid and compact camshaft and drive arrangement. This system is limited, however, since the valve opening and closing angles are compromised over the engine's entire load and speed range.

One means for achieving improved performance is through the use of intake-valve control. The valve-overlap period, i.e., the period between when the intake valve opens and the exhaust valve closes, has a significant influence on engine breathing and performance characteristics. Operation of a high-performance engine at rated speed requires a large valve-overlap period to compensate for gas inertia effects. Since these effects are minimal at low speeds, the engine generates its maximum load-speed torque with a small valve-overlap period. In order to meet both of these objectives, various control systems have been designed with the capability to provide variable overlap periods.

Numerous different variable valve timing mechanisms have been tried. Most of these designs accomplish variable overlap by shifting, i.e., phasing, of the intake camshaft relative to the exhaust camshaft to change the angle between when the intake valve opens and the exhaust valve closes. Thus, camshaft phasing involves changing the angular relationship between one or more of the engine's camshafts and the crankshaft. Several automotive manufacturers are adopting camshaft phasing as a limited form of valve timing control for their engines. Camshaft phasing has been used primarily for changing the valve-overlap angle and has been adopted almost exclusively for this use on the intake camshaft of engines with twin camshafts. Variable ovelaps allow for improved performance, improved fuel consumption and lower emissions. In most applications, the valve overlap angle is varied to achieve a small overlap at low-speed and tight-load conditions and large overlaps at high speeds and loads.

Many camshaft-phasing mechanisms are being proposed for the marketplace. Most units are used to vary the phasing of the intake camshaft alone, but could be applied readily to any camshaft. Some of the phasing mechanisms are controlled by infinitely variable positioning devices, and most are electro-mechanically or electro-hydraulically controlled. Toyota's FX-1 concept car uses stepper-motor control to adjust continuously the phasing angles (i.e., relative to the crankshaft) of both the intake and exhaust camshafts by 10 degrees. Renold-of-Britain's design is hydraulically controlled and adjusts timing over a 15-degree range relative to the crankshaft. Alfa Romeo introduced into production a two-stage phase adjuster which can advance a camshaft by a fixed angle of 16 degrees with no intermediate angles. This device has a solenoid-actuated hydraulic control which is activated as a function of load and speed. Nissan's valve control system similarly makes a 14-degree change in the valve opening and closing angles by phasing the intake camshaft relative to the crankshaft. It is also a two-stage mechanism which is hydraulically controlled and solenoid actuated.

U.S. Pat. No. 4,388,897 to Rosa, proposes a variable valve timing device comprising a camshaft wormed over part of its length and carrying a splittable cam assembly separable along the axis of rotation of the camshaft. However, in the Rosa device the control over the valve event is dependent upon the speed of the camshaft. Moreover, the degree of control over the valve event permitted by the Rosa device is limited by the sensitivity of the linkage that restrains axial movement of the camshaft. Furthermore, the axial shifting principle of the Rosa device renders it difficult to miniaturize to conserve space in the engine compartment.

One problem with camshaft phasing is that the dwells remain constant and the intake valve's closing angle may be compromised when the opening angle is varied. This compromising effect becomes more pronounced for a camshaft having both intake and exhaust cams. This is because intake closing, exhaust opening, and exhaust closing angles all are potential tradeoffs. For this reason, camshaft phasing for the purpose of controlling valve-overlap periods is restricted at present to phasing the intake camshaft on engines having dual camshafts. Thus this expanded technology carries with it inherent disadvantages which limit the benefits to be achieved through its use.

At low spark-ignition engine speeds, performance optimization dictates a small overlap angle to reduce the likelihood that intake and exhaust gases mix. Gas-flow dynamics preclude mixing at high engine speeds, and therefore a large valve overlap angle is desirable to achieve greater volumetric efficiency and the corresponding increase in power output. If the valve overlap angle can be varied during the operation of the engine, then the flow rate into and out of the engine can be maximized both at high speeds and for full-load operation at any speed. Increasing the valve-overlap angle for the low- and mid-speed ranges is beneficial for emissions control because of the mixing of intake gases and exhaust products. However, this same increase in valve-overlap angle for the low- and mid-speed ranges hurts power output and economy.

Improving the fuel consumption efficiency of an internal combustion engine can be accomplished by decreased friction, higher compression ratios, improved combustion, and reduction of an engine's pumping losses. The pumping losses, which are the negative work required by an engine to intake and exhaust gases during operation, are a significant fraction of the losses which reduce the fuel consumption efficiency of the engine. In the case of a spark-ignition engine, these losses result primarily from the resistance associated with the flow of fresh air past the throttling valve before entering the individual combustion chambers of the engine. The throttle performs the necessary function of controlling the engine power output by varying the amount of air/fuel mixture available for consumption. Thus, any elimination of the throttle valve for the purpose of reducing pumping losses requires an alternative means of controlling the amount of air/fuel mixture inducted into the combustion chamber to support the required engine load.

A standard spark-ignition automobile engine operates the majority of the time at part throttle where pumping losses are greatest. The penalty in part-load performance of a conventional spark-ignition engine varies from 3.5% of the nominal mean-effective pressure at wide-open throttle to nearly 100% for a fully throttled idling engine. These performance penalties are attributed primarily to the throttling process. It is believed that running an engine at wide-open throttle throughout its load-speed range would improve the average overall efficiency of the engine by about 20%.

OBJECTS AND SUMMARY OF THE INVENTION

It is a principal object of the present invention to provide an improved apparatus and method to cyclically actuate an actuation member.

A further object of the present invention is to provide an improved apparatus and method to cyclically actuate an actuation member while controllably varying the proportion of a cycle over which the actuation member is actuated in each cycle.

It also is an object of the present invention to provide an apparatus and method that enables optimization of the valve-overlap period for any operating condition independent of the influence of engine operating characteristics such as load and speed.

Another object of the present invention is to provide an apparatus and method for virtually infinite control of camshaft phasing over a 360-degree range.

A further object of the present invention is to provide an apparatus and method for optimizing the valve-overlap period for any operating condition and that applies to internal combustion engines with single or twin camshaft arrangements.

It also is an object of the present invention to provide an apparatus and method for varying the valve-overlap angle associated with the intake and exhaust valve of a combustion chamber of an internal combustion engine.

It is also an object of the present invention to provide an apparatus and method to reduce the pumping losses associated with the standard air-intake system for spark ignition engines.

Another object of the present invention is to provide an apparatus and method for controlling the amount of charge inducted to support the required engine load of spark ignition engines without the pumping losses associated with a standard, i.e., throttled, air intake system.

A further object of the present invention is to provide an apparatus and method for eliminating the pumping losses of a spark-ignition engine while maintaining the same useful output.

It also is an object of the present invention to provide an apparatus and method for controlling the induction of an air/fuel charge into the compression chamber of a spark-ignition engine by varying the valve timing applied to the intake valve of the compression chamber.

Another object of the present invention is to provide an improved camshaft design which will provide better performance over the entire operating range of the engine.

A further object of the present invention is to provide an apparatus and method for optimizing the engine characteristics pertaining to emissions, fuel economy, and performance at each load/speed point of the engine's operating range.

A still further object of the present invention is to eliminate the throttle valve of a standard spark-ignition engine and the operating losses associated with same.

Still another object of the present invention is to provide an improved apparatus and method for inducting air into the compression chamber of a standard spark-ignition engine at atmospheric pressure.

Yet another object of the present invention is to provide an apparatus and method for controlling the scheduling of exhaust valve-timing events for a spark-ignition engine.

Additional objects and advantages of the invention will be set forth in part in the description which follows, and in part will be obvious from the description, or may be learned by practice of the invention. The objects and advantages of the invention may be realized and attained by means of the instrumentalities and combinations particularly pointed out in the appended claims.

To achieve the objects and in accordance with the purpose of the invention, as embodied and broadly described herein, the apparatus of the present invention comprises a hollow shaft rotatable about an axis of rotation; an inner shaft rotatably carried within the hollow shaft; means for actuating the actuation member, the actuating means being carried by one of the shafts; means for linking the shafts for rotation about the axis without relative rotation between the shafts, the linking means being connected to the shafts; drive means connected to the shafts for rotating the shafts about the axis; and control means for imparting a controlled relative rotation between the shafts while the drive means is driving same, the control means being connected to the linking means.

The actuating means preferably comprises a splittable cam member which in turn comprises a matched pair of camlobe members. One of the camlobe members is mounted on each of the shafts. The camlobe members are located side-by-side for actuating a single actuation member such as a cam follower. The camlobe members are angularly variable relative to each other by relative rotation of the respective shafts which carry the camlobe members.

In an alternative embodiment, the actuating means preferably comprises a cam member carried on one of the shafts that is variable relative to another cam member carried on the other of the shafts. The two cam members are separated from each other along the shafts and actuate different actuation members. A cam opening is defined in the hollow shaft, and the cam member or camlobe member, depending upon the embodiment, carried by the inner shaft projects through the cam opening. Thus, some embodiments have respective cams carried on the two shafts, some have respective camlobe members carried on the two shafts, and some embodiments have a combination of cams and camlobe members carried on the shafts.

The linking means preferably comprises a variable transmission having a reference element connected to one of the shafts, an output element connected to the other of the shafts, and an input element. The reference element preferably comprises either an internal gear, or a flexible external gear. The output element then preferably comprises the other gear, either internal or external, depending upon which one was chosen for the reference element. Preferably, the input element comprises an elliptical ball-bearing assembly. The flexible external gear member receives the elliptical ball-bearing assembly therein to deform and engage the external gear with the internal gear, thus non-rotatably linking the hollow shaft to the inner shaft so that they rotate in unison.

The control means preferably comprises an electric motor having an armature shaft connected to the elliptical ball-bearing assembly to rotate same upon operation of the motor. Rotation of the elliptical ball-bearing assembly causes the splines of the external gear to engage the splines of the internal gear. This engagement results in creeping of one of the external and internal gears relative to the other because of a smaller number of splines over the circumference of one of the gears relative to the number of splines on the circumference of the other of the gears. The creeping of one gear relative to the other gear causes relative rotation between same, and ultimately relative rotation between the inner shaft and the hollow shaft because each shaft is connected to one of the external and internal gears.

The electric motor can be actuated via a linkage with the accelerator pedal of an automobile.

In another embodiment, the control means further comprises an electronic control unit which controls operation of the electric motor. The electronic control unit can include one or more microprocessor units which receive engine operating parameters or operator supplied inputs. The electronic control unit controls the electric motor depending upon one or more operating conditions of the engine and/or operator supplied inputs.

Yet another embodiment of the apparatus of the present invention constitutes a hollow shaft rotatable about an axis of rotation; an inner shaft rotatably carried within the hollow shaft; and means for actuating an actuation member, the actuating means being carried by at least one of the shafts. Preferably, the hollow shaft defines a cam opening therethrough in a portion thereof. Moreover, the actuating means includes a fixed cam (or camlobe member) that is fixed to the hollow shaft and a variable cam (or camlobe member) that is fixed to the inner shaft and projecting through the cam opening. Rotation of the inner shaft relative to the hollow shaft permits a variable angular separation between the fixed cam (or camlobe member) and the variable cam (or camlobe member) as the variable cam (or camlobe member) moves with rotation of the inner shaft.

Another alternative embodiment of the invention permits an additional element of control for actuating an actuation member and comprises a control means which includes a second variable transmission and a second electric motor. The second variable transmission has a second reference element, a second output element, and a second input element. Preferably, an electronic control unit controls the second electric motor and the first electric motor. The output shaft of the second electric motor is connected to the second input element. Moreover, the second reference element is connected to the drive means, and the second output element is connected to the hollow shaft. In this further alternative embodiment, actuation of the second electric motor causes the hollow shaft and the inner shaft to rotate in unison, but the rotation is relative to the rotation of the driving means. Thus, this further alternative embodiment of the present invention permits a change in the relative rotation of the shafts from the driving means. Activation of the first electric motor causes relative rotation between the hollow shaft and the inner shaft in much the same fashion as accomplished in the embodiment having only a single variable transmission.

The rotational control over the hollow shaft and the inner shaft of the present invention extends to any actuation means carried thereon, such as a fixed cam (or camlobe) member carried on the hollow shaft and a variable cam (or camlobe) member carried on the inner shaft and projecting through the cam opening defined in the hollow shaft. Thus, it is possible using the apparatus of the present invention to change the rotation of both cams (or camlobes) relative to the rotation of the drive means. It also is possible to advance the position of the variable camlobe member so that as the two shafts rotate, the variable camlobe member will engage an actuation member in advance of the fixed camlobe member. Similarly, it is possible to retard the rotation of the variable camlobe until it attains a desired retarded angular position relative to the fixed camlobe. In the retarded position, the variable camlobe will engage the actuation member later than engagement by the fixed camlobe member as the two camlobe members rotate. Similarly, the relative angular position of fixed and variable cam members can be changed in the same fashion.

To further achieve the objects and in accordance with the purpose of the invention, as embodied and broadly described herein, there is provided an internal combustion engine. The engine comprises a combustion chamber with an intake valve and an exhaust valve and an apparatus for actuating and deactuating at least one of the valves. The apparatus for actuating and deactuating at least one of the valves includes a hollow shaft rotatable about an axis of rotation. An inner shaft is rotatably carried within the hollow shaft. A cam member or splittable cam member actuates one of the intake valve and exhaust valve. Means are provided for linking the shafts for rotation about the axis without relative rotation between the shafts. The linking means is connected to the shafts. Drive means are connected to the shafts for rotating the shafts about the axis. The splittable cam member includes a fixed camlobe member carried by one of the shafts and a variable camlobe member carried by the other of the shafts. The angular position of the variable cam (or camlobe) member is variable relative to the fixed cam (or camlobe) member. The fixed cam (or camlobe) member is variable relative to a point of reference arbitrarily chosen on the drive means. Control means are provided for imparting controlled relative rotation between the shafts while the drive means is driving same. The control means is connected to the linking means.

In a further embodiment, the control means includes means for imparting controlled relative rotation between the shafts and the drive means.

To further achieve the objects and in accordance with the purpose of the invention, as embodied and broadly described herein, there is provided a method of attaining a desired engine performance comprising the step of changing the angular position of a variable camlobe member relative to a fixed camlobe member from a first angular position to a second angular position. In changing from the first angular position to the second angular position, the variable camlobe member is moved in a predetermined direction relative to the direction of rotation of the camshaft. The predetermined direction and the magnitude of the angular movement of the variable camlobe member are dependant at least in part upon at least one desired operating condition of the engine. This method applies to any valve actuated by a splittable cam member.

In a further embodiment of the invention, the angular positions of the camlobe members relative to an arbitrary reference point of the drive means are changed from a first relative angular position to a second relative angular position. Moreover, the magnitude and direction of the changes in angular position of the camlobe members are dependent upon at least one desired operating condition of the engine.

To further achieve the objects and in accordance with the purpose of the invention, as embodied and broadly described herein, there is provided an internal combustion engine comprising a combustion chamber with an intake valve and an exhaust valve. The engine further comprises an apparatus for actuating and deactuating both of the valves. The apparatus for actuating and deactuating both of the valves includes a hollow shaft rotatable about an axis of rotation. An inner shaft is rotatably carried within the hollow shaft. An intake cam member actuates the intake valve, and an exhaust cam member actuates the exhaust valve. There are means for linking the shafts for rotation about the axis without relative rotation between the shafts. This linking means is connected to the shafts. There are drive means connected to the shafts for rotating the shafts about the axis, and the drive means carry an arbitrarily chosen reference point thereon. One of the intake cam member and the exhaust cam member is carried by the hollow shaft, and the other of the cam members is carried by the inner shaft. Each cam member is at a fixed angular position relative to the shaft which carries it. The angular positions of the cam members is variable relative to each other and are at respective predetermined angular positions relative to each other. The angular positions of the cam members are variable relative to the reference point on the drive means and are at predetermined angular positions relative to this arbitrarily chosen reference point of the drive means. The control means imparts controlled relative rotation between the shafts while the drive means is driving same. This control means is connected to the linking means. In a further embodiment, this control means can include means for imparting controlled relative rotation between the drive means and the shafts while the drive means is driving the shafts.

To further achieve the objects and in accordance with the purpose of the invention, as embodied and broadly described herein, there is provided a method of reducing pumping losses and improved brake specific fuel consumption for a spark ignition engine, the engine having a combustion chamber with a piston therein for varying the volume of same, an induction manifold disposed between the atmosphere and the combustion chamber, an intake valve disposed between the combustion chamber and the induction manifold, and a camshaft for actuating the intake valve. The method comprises: inducting a charge of fluid into the combustion chamber; holding the intake valve open during a portion of the compression stroke of the piston; expelling a portion of the inducted charge from the combustion chamber; preventing the expelled portion of the inducted charge from communicating with the atmosphere; and closing the intake valve during the remainder of the compression stroke and after the portion of the inducted charge is expelled.

Preferably, the expelled portion of the inducted charge is prevented from communicating with the atmosphere. In some applications this is accomplished by the provision of a check valve disposed between the induction manifold and the atmosphere. The check valve permits fluid to flow from the atmosphere through the intake valve and into the combustion chamber during the induction stroke of the piston. However, the one-way structure of the check valve prevents the expelled portion of the inducted charge from passing through the check valve and communicating with the atmosphere.

The accompanying drawings, which are incorporated in and constitute a part of this specification, illustrate embodiments of the invention and, together with the description, serve to explain the principles of the invention.

DESCRIPTION OF THE PREFERRED EMBODIMENTS

Figure 1:
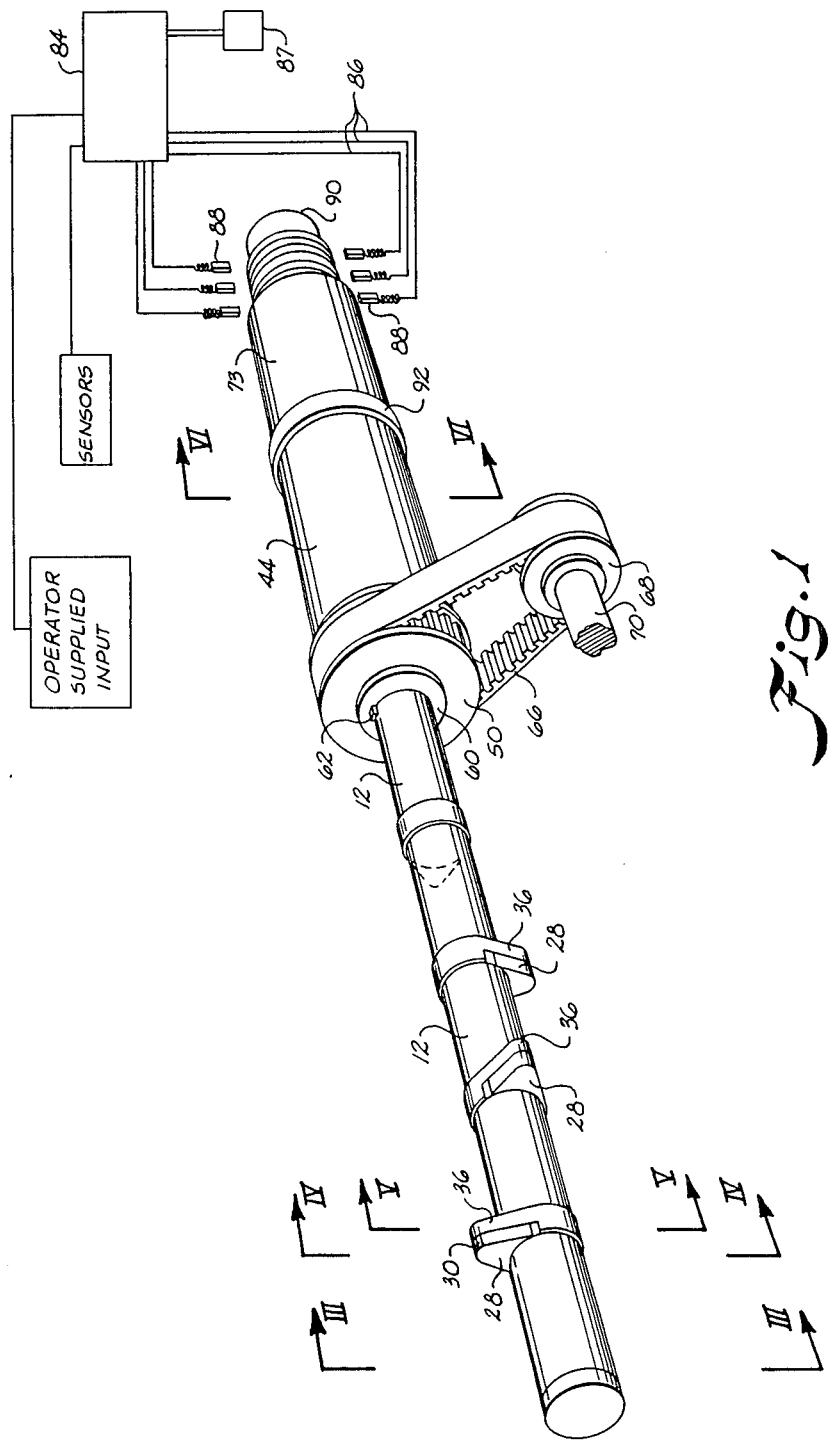
FIG. 1 is a perspective view of an embodiment of the apparatus of the present invention, with certain components represented schematically.

Reference will now be made in detail to the present preferred embodiments of the invention, examples of which are illustrated in the accompanying drawings.

The apparatus for cyclically actuating an actuation member comprises a hollow shaft which is rotatable about an axis of rotation. As embodied herein and shown for example in FIGS. 1-2, a hollow shaft 12 has a centrally located rotational axis 14. Shaft 12 preferably is formed as a hollow cylinder with the hollow interior having a circular cross-section. Hollow shaft 12 preferably is formed of metal or any other rigid material capable of withstanding the operating environment of shaft 12. For some applications, shaft 12 may be formed of a plastic or resinous material that is a poor conductor of electricity and magnetically inert.

The cyclically actuating apparatus of the present invention further comprises an inner shaft rotatably carried within the hollow shaft. As embodied herein and shown for example in FIGS. 2-6, an inner shaft 16 has a cross-sectional periphery shaped like a polygon, such as the hexagon shown in FIGS. 2-6. Inner shaft 16 preferably is formed of a rigid metallic material and preferably is carried concentrically about axis 14 within hollow shaft 12 via a plurality of bushings 18. However, shaft 16 could be carried eccentrically about axis 14 within shaft 12, but this embodiment is not illustrated in the drawings herein. Moreover, shaft 16 could have a partial or full circular cross-sectional profile in an embodiment assembled differently than the embodiment illustrated in the Figs. For example, bushings 18 could be eliminated. Hollow shaft 12 could comprise two sections joined around a circular inner shaft carrying a plurality of cam members integrally formed thereon.

In the embodiment shown in FIGS. 1-6, each bushing 18 has a cross-sectional periphery shaped like a circle so that bushing 18 rotates concentrically about axis 14 within hollow shaft 12. Each bushing has an inner opening 20 extending along its entire length. Opening 20 is configured to nonrotatably receive the exterior profile of inner shaft 16. Thus, bushings 18 serve to permit inner shaft 16 to be carried within hollow shaft 12 and carried rotatably about the same axis of rotation 14.

Bushings 18 preferably are formed of a rigid material such as brass or another material capable of withstanding the operating environment of shafts 12, 16.

A circular profile for opening 20 suffices for the hexagonal shaped profile of inner shaft 16 depicted in the drawings. The circular shaped profile is likely to wear faster than the profile which exactly matches that of the inner shaft. However, the circular shaped profile of bushing opening 20 is the easiest to manufacture.

The apparatus for cyclically actuating an actuation member according to the present invention further comprises means for actuating the actuation member. The actuating means is carried by at least one of the shafts. As embodied herein and shown for example in FIGS. 1-4, the actuating means preferably comprises a splittable cam member 21 which includes a variable camlobe member 28 and a fixed camlobe member 36. Variable camlobe member 28 has a nose portion 30 for engaging an actuation member. As shown in FIG. 2, an inner shaft opening 32 is formed at the opposite end of camlobe 28 and is configured for non-rotatably receiving therethrough, inner shaft 16. Camlobe 28 is formed of a metallic or other material suitable for the operating environment of camlobe 28. As illustrated in the preferred embodiment of the invention of FIG. 2, shaft 12 defines a cam opening 34 which is cut completely through the thickness of the wall which defines hollow shaft 12.

As will become apparent upon further reading of this specification, the terms fixed and variable have been arbitrarily selected. Applicants have found it convenient to refer to the cam (or camlobe) which projects through cam opening 34 as the variable member. However, the shafts move relative to one another, and thus the cam (or camlobe) members mounted thereon move relative to one another. Thus, the respective positions of the cam (or camlobe) members can be variable relative to each other.

In the embodiment of FIG. 2, the assembly of the shaft and splittable cam member components can be effected as follows: a bushing 18 is inserted into hollow shaft 12 past cam opening 34. A variable camlobe member 28 is then inserted through cam opening 34 of hollow shaft 12. Then another bushing 18 is inserted into hollow shaft 12 until it meets variable camlobe member 28. Inner shaft 16 is inserted through bushing opening 20 and through inner shaft opening 32 of variable camlobe member 28, so that rotation of inner shaft 16 about axis 14 rotates inner shaft 16 and camlobe 28 in unison. Thus, inner shaft 16 non-rotatably carries variable camlobe member 28.

Figure 4:
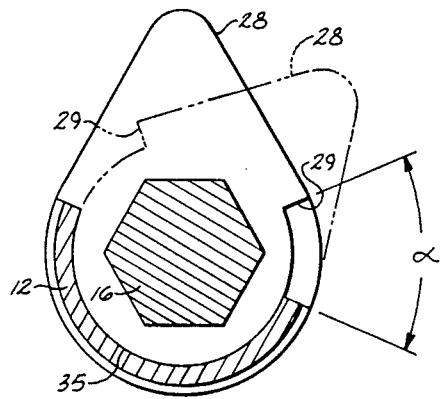
FIG. 4 is a cross-section taken along the line IV—IV of FIG. 1.
Figure 5:
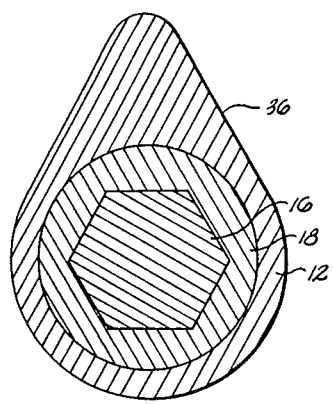
FIG. 5 is a cross-section taken along the line V—V of FIG. 1.

As shown in FIG. 4, variable camlobe member 28 has a pair of ears 29 which engage a portion of cam opening 34 defined in hollow shaft 12. Variable camlobe member 28 can be adjusted over an angular range of rotation in the embodiment shown in FIG. 4. This range of rotation is limited by the size of cam opening 34 and the relative size of variable camlobe member 28. The position of ears 29 also affects the amount of rotational motion to be afforded variable camlobe member 28 within cam opening 34 of hollow shaft 12. In the embodiment shown in FIG. 4, the portion of variable camlobe member 28 having shaft opening 32 has a peripheral riding surface 35 which engages and rotates relative to the interior surface of hollow shaft 12.

Figure 3:
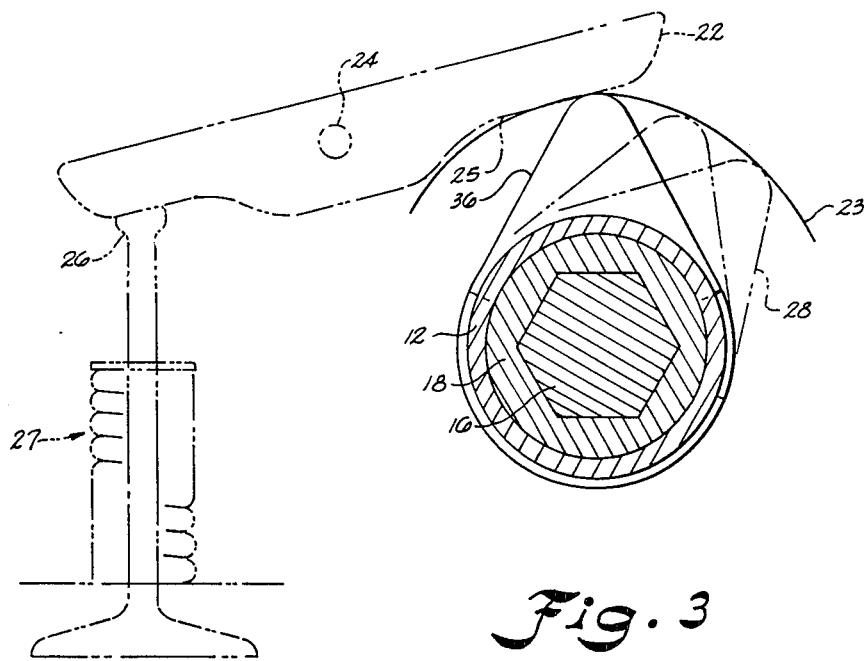
FIG. 3 is a cross-section taken along the line III—III of FIG. 1.

As embodied herein and shown for example in FIG. 3, the actuation member preferably comprises a cam follower 22, which is indicated in phantom as rotating about a pivoting shaft 24 with one end engaging a valve tappet 26 of an internal combustion engine valve 27.

Figure 11:
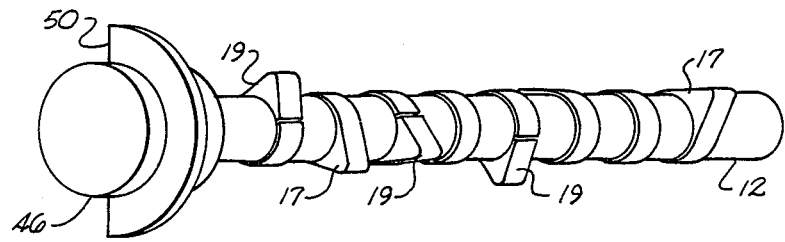
FIG. 11 is a schematic representation of yet another embodiment of the present invention.
Figure 12:
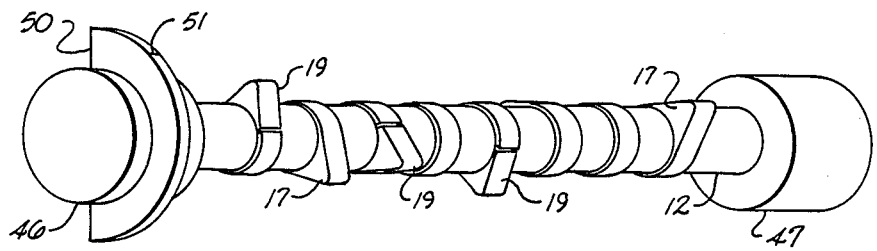
FIG. 12 is a schematic representation of still another embodiment of the present invention.

In a preferred embodiment of the present invention, the actuating means further comprises a fixed camlobe member 36, as illustrated for example in FIGS. 1, 2, 3, and 5. Fixed camlobe member 36 can be formed of the same or similar material as variable camlobe member 28 and has a matching or complimentary profile, as desired for the particular application, at the nose portion where the actuating means engages and actuates an actuation member such as cam follower 22. Fixed camlobe member 36 can be formed integrally with hollow shaft 12 or can be a separate member fixed to the exterior surface of hollow shaft 12 and carried thereby so that fixed camlobe member 36 does not rotate relative to hollow shaft 12. Moreover, in the embodiment shown in FIGS. 1 and 2, fixed camlobe member 36 and variable camlobe member 28 are arranged adjacent each other and comprise a single actuating means. Each camlobe member 28, 36 is one half the width of a conventional cam member carried by a conventional camshaft. Camlobe member widths may be varied as dictated by wear characteristics. However, as shown in FIGS. 11 and 12, a full width variable cam member 19 can be projected through cam opening 34 and can be located apart from where a full width fixed cam member 17 is attached to hollow shaft 12, as desired by the particular application.

Figure 9:
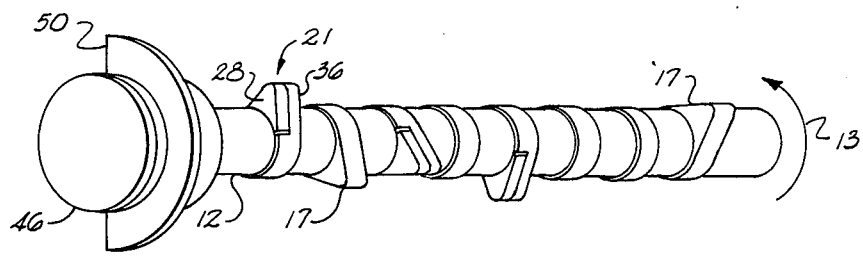
FIG. 9 is a schematic representation of a further embodiment of the present invention.

Various combinations of fixed and variable cam members or camlobe members and relative positionings thereof along hollow shaft 12 and inner shaft 16 are contemplated. The specific member and arrangement of same is controlled primarily by the particular application desired. For example, as shown in FIG. 9, a plurality of fixed cam members 17 and splittable cam members 21 having variable camlobe members can be provided. Moreover, as shown in FIGS. 11 and 12, one or more variable cam members 19 can be provided with a spaced apart fixed cam member 17. Furthermore, as few as a single variable camlobe member 28 can be provided with one or more fixed cam (and/or camlobe) members on a single camshaft comprised of hollow shaft 12 and inner shaft 16.

Preferably, the fixed and variable camlobe members are designed to provide profiles that permit a smooth transition of the actuation of cam follower 22 from one member to the other. In this way, during a large relative adjustment of the camlobe members, one camlobe member will not allow the valve to begin closing before contact is made with the other camlobe member. Preferably the actuation member, such as cam follower 22, will be contoured to accept the motion path of the actuating means so that a smooth transition occurs. For example, as shown in FIG. 3, variable camlobe 28 moves in a generally circular path 23, and cam follower 22 is configured with a generally circular arcuate surface 25 for accepting variable camlobe 28 as camlobe 28 moves in its generally circular path.

In a further alternative embodiment of the present invention, the actuating means can comprise a magnetic element (not shown) carried on inner shaft 16. In this case, which is not illustrated in the drawings, there is no need for any cam opening 34 in hollow shaft 12. Hollow shaft 12 is then preferably fabricated of a material conducive to the actuation of an actuation member by the magnetic element carried on inner shaft 16. Moreover, the magnetic element carried on inner shaft 16 can be used in conjunction with another magnetic element carried on hollow shaft 12 if desired by the particular application. Furthermore, a plurality of magnetic elements can be arranged as desired on shafts 12, 16, as is the case with fixed and variable camlobe members 36, 28.

In accordance with the present invention, means are provided for linking the shafts for rotation about the axis without relative rotation between the shafts. The linking means is connected to the shafts. As embodied herein and shown for example in FIG. 2, the linking means preferably comprises a variable transmission indicated generally by the numeral 38 and comprising a reference element, an output element, and an input element. One of shafts 12, 16 is connected to the reference element of the variable transmission, and the other of shafts 12, 16 is connected to the output element of the variable transmission. Preferably, the drive means (described hereinafter) is connected to whichever shaft in this embodiment is connected to the reference element of the variable transmission.

Preferably, the variable transmission comprises a Harmonic Drive brand variable transmission gear mechanism such as described in U.S. Pat. No. 2,906,143, entitled, "Strain Wave Gearing," which is hereby incorporated herein by reference. The reference element of the embodiment of the variable transmission depicted in FIG. 2 comprises a rigid circular spline 40 having a rigid internal gear 42. This reference element is rigidly attached to hollow shaft 12 via mechanical connections, including a rigid cylindrical member 44 and a pulley wheel 50, which has an opening at the center thereof to permit passage therethrough, of inner shaft 16. Pulley wheel 50 is non-rotatably attached to cylindrical member 44 as by a dowel 51 and bore 53 arrangement shown in FIG. 2. One end of hollow shaft 12 is rigidly connected to pulley wheel 50. Thus, hollow shaft 12 rotates as one in this embodiment with the reference element of the variable transmission.

Furthermore, the output element of the preferred embodiment of the variable transmission comprises a cylindrical cup-shaped member 52 having a non-rigid, external gear 54. On the end of cup-shaped member 52 opposite non-rigid, external gear 54, there is an attachment flange 56 for non-rotatably receiving and securing therein, one end of inner shaft 16. Thus, inner shaft 16 rotates in unison with cup-shaped member 52, and external gear 54.

Figure 6:
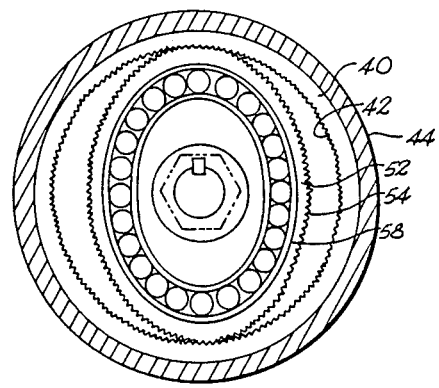
FIG. 6 is a cross-section taken along the line VI—VI of FIG. 1.

In the preferred embodiment of the variable transmission depicted in FIG. 2, the input element comprises an elliptical ball-bearing assembly 58 received within cup-shaped member 52 in the vicinity of non-rigid, external gear 54. As shown in FIG. 6, elliptical ball-bearing assembly 58 deforms non-rigid external gear 54 so that gear 54 meshes with internal gear 42 of rigid circular spline 40 in the vicinity of the major axis of elliptical ball-bearing assembly 58. Thus, cylindrical cup-shaped member 52 and external gear 54 are linked with rigid circular spline 40 and internal gear 42 so that the linked components rotate in unison. Since inner shaft 16 is rigidly connected to external gear 54 via cup-shaped member 52, and hollow shaft 12 is rigidly connected to internal gear 42 via cylindrical member 44, etc., as explained above, the variable transmission links shafts 12, 16 for rotation about axis 14 without relative rotation between shafts 12, 16.

External gear 54 has two fewer splines around its circumference than the number of splines forming the complete circumference of internal gear 42, and this differential performs a significant function in achieving relative rotation between shafts 12, 16, as hereinafter explained.

In alternative embodiments of the invention, the linking means may comprise other types of variable transmissions which comprise a reference element, an output element, and an input element. Examples, which are not shown in the FIGS., include a slip-fit brake, a clutch, a planetary gear set, or an accelerator linkage assembly. Another example not shown in the FIGS. is another Harmonic Drive brand variable transmission gear mechanism comprising pancake gear components. This pancake gear component mechanism is described in U.S. Pat. No. 2,959,065 entitled, "Spline and Rotary Table," which is hereby incorporated herein by reference. This pancake gear mechanism is compact and especially suitable for embodiments requiring a minimal use of space.

The apparatus for cyclically actuating an actuation member further comprises drive means connected to the shafts for rotating the shafts about the rotational axis. As embodied herein and shown for example in FIG. 1, the drive means preferably comprises pulley wheel 50, non-rotatably secured to hollow shaft 12 via a locking flange 60 and a spline lock member 62 inserted into a spline keyway 64 defined in locking flange 60. The drive means of this embodiment further comprises a belt 66 which is rotated by a crankshaft pulley wheel 68 connected to a crankshaft 70 of an engine (not shown). The engine rotates crankshaft 70 which drives shafts 12, 16 via belt 66 and pulley wheels 50, 68. The relative rotational cycles of crankshaft 70 and shafts 12, 16 have a relationship which depends upon the size of pulley wheels 50, 68.

In further accordance with the present invention, control means are provided for imparting a controlled relative rotation between the shafts while the drive means is driving same. The control means is connected to the linking means. As embodied herein and shown for example in FIG. 2, the control means preferably comprises an electric motor 72 having an armature shaft 74. Electric motor 72 is non-rotatably mounted within a housing 73 which is in turn nonrotatably connected to rigid cylindrical member 44 via a connecting ring 92 so that electric motor 72 rotates in unison with shafts 12, 16.

Elliptical ball-bearing assembly 58 is connected in a non-rotatable fashion to the free end of armature shaft 74. For example, as shown in FIG. 2, a spline-lock member 76 is received partially within a spline-keyway 78 formed in the free end of armature shaft 74 and partially within a spline-keyway 80 formed within a locking flange 82 of ball-bearing assembly 58. As noted above, external gear 54, internal gear 42, and elliptical ball-bearing assembly 58, respectively comprise the output, reference and input elements of the particular variable transmission embodiment depicted in FIGS. 1 and 2.

Motor 72 rotates armature shaft 74 and elliptical ball-bearing assembly 58 connected thereto. During rotation, elliptical assembly 58 deforms cup-shaped member 52 to accommodate the major axis of elliptical assembly 58. As elliptical assembly 58 rotates, the splines of external gear 54 engage the splines of internal gear 42 in the vicinity of the major axis of elliptical assembly 58. However, two fewer splines comprise external gear 54 than comprise internal gear 42. Thus, with each complete revolution of elliptical assembly 58, there is less than a one-to-one correspondence between the splines of the external gear and the splines of the internal gear. External gear 54 indexes two splines around internal gear 42 for each revolution of elliptical assembly 58. This results in a net translation between the two gears in one direction or another, depending upon the direction of rotation of elliptical assembly 58. The relative rotation results because the reduced number of splines on the external gear means that two of the external gear splines will twice engage splines of the internal gear during each complete rotation of elliptical assembly 58. It is this relative rotation between gears 42, 54 that permits relative rotation between the two shafts 12, 16, which are separately connected to the two gears.

In an alternative embodiment of the present invention, the control means further comprises an electronic control unit 84. Actuation of electric motor 72 is controlled via appropriate electrical leads 86 connecting a power source 87 via unit 84 with contacting brushes 88, which electrically engage a slip ring assembly 90 of electric motor 72. Electronic control unit 84 can contain one or more microprocessor units which can be preprogrammed to process input information constituting operating parameters of an engine which includes an actuation member such as cam follower 22. These microprocessor units also can be programmed to receive operator supplied inputs, which can correspond to an engine performance that the operator desires to attain. This electronic control unit 84 can be preprogrammed to control motor 72 based upon the operating status of the engine, as determined from the operating inputs received by unit 84, or based upon the operator supplied inputs received by unit 84, or based in part upon both. Electronic control unit 84 can be preprogrammed to respond to operator supplied inputs which correspond to at least one operating condition of the engine that the operator desires to attain. Moreover, the engine in question can be the same engine that provides the driving force to rotate crankshaft 70. The inventors contemplate that preprogramming of the electronic control unit will require determining the operating and performance characteristics of the particular engine.

Operation of the embodiment of the apparatus of the present invention depicted in the FIGS. now will be explained. This explanation assumes that crankshaft 70 is the crankshaft of an internal combustion engine, and cam follower 22 activates an intake valve of a combustion chamber of the engine which drives crankshaft 70. However, cam follower 22 could just as easily activate an exhaust valve of the engine's combustion chamber.

Pulley wheel 50 is rotated by crankshaft 70 via belt 66 at a predetermined number of cycles, i.e., complete revolutions, per second. The number of cycles per second is dependent upon the engine speed and the size ratio between pulley wheel 50 and crankshaft pulley wheel 68. Pulley wheel 50 is rigidly attached to cylindrical member 44 and to hollow shaft 12. Cylindrical member 44 carries internal gear 42. Inner sshaft 16 is rigidly attached to cup-shaped member 52 which carries external gear 54. Cup-shaped member 52 is disposed relative to cylindrical member 44 so that external gear 54 intermeshes with internal gear 42 along the major axis of elliptical ball-bearing assembly 58. Thus, elliptical ball-bearing assembly 58 is disposed within cup-shaped member 52 and deforms same to cause external gear 54 to engage internal gear 42. The engagement of internal gear 42 with external gear 54 links cylindrical member 44 with cup-shaped member 52 so that the two rotate in unison, and accordingly hollow shaft 12 rotates in unison with inner shaft 16.

Motor housing 73 is rigidly attached to cylindrical member 44 so that these two members also rotate in unison. Electric motor 72 is rigidly attached to motor housing 73 so that electric motor 72 also rotates in unison with each of motor housing 73, cylindrical member 44, and shafts 12, 16. The free end of armature shaft 74 is rigidly attached to elliptical ball-bearing assembly 58. When electric motor 72 is inoperative, armature shaft 74 of motor 72 also rotates in unison with shafts 12, 16. When motor 72 is operated, armature 74 rotates ball-bearing assembly 58 relative to cup-shaped member 52 and cylindrical member 44. Rotation of ball-bearing assembly 58 relative to internal and external gears 42, 54, respectively, causes relative rotation between internal gear 42 and external gear 54. This relative rotation is caused by the larger number of splines constituting internal gear 42 relative to the number of splines in external gear 54, as explained above. As elliptical ball-bearing member 58 is rotated relative to the two gears, the relative rotation between the two gears causes relative rotation between shafts 12 and 16, which are separately connected to one of the two gears. Thus, operation of electric motor 72 causes relative rotation between shafts 12, 16 while the engine is driving shafts 12, 16 via pulley wheel 50. The amount of relative rotation is controlled by the number of rotations of armature shaft 74 of electric motor 72. Moreover, reversing electric motor 72 cause relative rotation between shafts 12, 16 in the opposite direction to restore same to their original relative rotational orientation.

The operation of electric motor 72 can be controlled further by electronic control unit 84. Moreover, sensors of engine operating parameters can provide inputs to one or more microprocessor units of electronic control unit 84. Operator supplied inputs, such as depressing an accelerator pedal, also can be provided to one or more microprocessors of electronic control unit 84. The desired inputs can be used according to a predetermined microprocessor program, to control electric motor 72 according to the operating status of the engine as indicated by the sensors of various operating parameters like engine speed, emissions, etc. For example, at low engine speeds of a standard spark ignition engine lacking a throttle, one or more microprocessor units of control unit 84 can control electric motor 72 with operator supplied inputs, to cause relative rotation between shafts 12 and 16 that would angularly separate a splittable cam member and accordingly increase the duration over which an intake valve in the combustion chamber of the engine remained open during the compression stroke of the piston. This would have the effect of eliminating pumping losses associated with throttled engine performance.

In another alternative embodiment of the present invention, the control means comprises two variable transmissions connected to the hollow shaft and the inner shaft to permit an additional degree of operating flexibility. Applications of this embodiment are shown for example in FIGS. 7 and 10. As embodied herein and shown schematically for example in FIG. 7, a first variable transmission 92 has a first reference element 94, a first output element 96, and a first input element 98. Accordingly, in the embodiment shown in FIG. 7, first reference element 94 is connected to hollow shaft 12, and first output element 96 is connected to inner shaft 16. A first electric motor 100 is connected to first input element 98 to actuate same. A second variable transmission has a second reference element 102 connected to a drive means 104, a second output element 106 connected to hollow shaft 12, and a second input element 108 connected to electric motor 72. Electronic control unit 84 is connected to electric motors 72, 100, to control same.

Assuming that the first and second variable transmissions comprise the input, output, and reference elements of the variable transmission embodiment shown in FIG. 2, this alternative embodiment of the present invention operates as follows. Rotation of drive means 104 rotates hollow shaft 12 in unison with inner shaft 16. Activation of second input element 108 by electric motor 72 causes hollow shaft 12 and inner shaft 16 to rotate in unison. However, hollow shaft 12 and inner shaft 16 rotate relative to second reference element 102 and the drive means connected thereto. Thus, the entire relative timing of shafts 12, 16 can be changed relative to the original timing determined by rotation of the drive means. Moreover, if first input element 98 is rotated, then hollow shaft 12 rotates relative to inner shaft 16, thus permitting relative movement between any actuating elements carried by these respective shafts. These relative movements between the shafts and the respective splittable cam members carried thereby, can be reversed relative to the direction of rotation of the drive means. Reversal is accomplished by rotating the first input element in the opposite direction.

In further accordance with the present invention, there is provided an internal combustion engine. As embodied herein and shown for example in FIG. 8, an internal combustion engine is designated generally by the numeral 123. Engine 123 comprise a combustion chamber 110. Engine 123 also includes an intake valve and an exhaust valve and apparatus for actuating and deactuating one or both of said valves. Examples of the valves are shown in FIG. 8 and are similar to intake valve 114 of FIG. 8. The apparatus for actuating and deactuating one or both of the valves is shown in various embodiments and in various details in one or more of FIGS. 1–12. Engine 123 can be either a spark ignition engine or a compression ignition engine. The structure and operation of the apparatus for actuating and deactuating one or both of the valves is described above in detail. Furthermore, additional embodiments of the apparatus for actuating and deactuating both of the valves will be described below.

An alternative embodiment of the present invention illustrated in FIG. 9 is suitable for use as the camshaft in a single camshaft, internal combustion engine. Hollow shaft 12 carries at least one fixed cam member 17 and at least one fixed camlobe member 36. An inner shaft 16 (not shown) carries at least one variable camlobe member 28 which together with fixed camlobe member 36 carried on hollow shaft 12 comprises a splittable cam member 21. A control means and a linking means, as earlier described, are contained in a housing 46 such that drive pulley 50 is a drive means that is non-rotatably connected to one of the shafts to drive same.

The embodiment of the present invention illustrated in FIG. 9 can be operated as follows. As the drive pulley 50 is driven by an engine, shafts 12 and 16 are driven by drive pulley 50. However, drive pulley 50 is non-rotatably connected to only one of the shafts. Moreover, while the shafts are linked by the linking means, the control means, which also is connected to the linking means, can impart a controlled relative rotation between the shafts while the drive means is driving same. Thus, as the shafts are rotated by the drive means, the control means can change the angular relationship between variable camlobe member 28 and its adjacent fixed camlobe member 36 imparting a controlled relative rotation between the shaft which carries variable camlobe member 28 and the shaft which carries fixed camlobe member 36.

In accordance with the present invention, a method is provided for attaining a desired engine performance. As embodied herein, the method includes changing the angular position of the variable camlobe member relative to the fixed camlobe member from a first angular position to a second angular position. The direction in which the variable camlobe member moves relative to the direction of rotation of drive pulley 50 can be made dependent at least in part upon at least one desired operating condition of the engine. This is accomplished by using an electronic control unit 84 contained in housing 46. Similarly, electronic control unit 84 can determine the magnitude of the movement of the variable camlobe member relative to the fixed camlobe member at least in part based upon at least one desired operating condition of the engine. Different or identical engine operating conditions can be used to determine the magnitude, the direction, or the magnitude and direction of relative movement between the camlobe members.

The embodiment shown in FIG. 9 would be suitable as a camshaft for actuating intake valves and exhaust valves of an internal combustion engine having a combustion chamber with intake valves and exhaust valves. For example, the splittable cam member could be responsible for actuating the intake valves, and the fixed cam member could be responsible for actuating the exhaust valves. Variable camlobe member 28 could be moved in the same direction (advancing) or in the opposite direction (retarding) relative to the direction of rotation imparted by drive pulley 50. Assuming that drive pulley 50 is driving the shafts in the direction indicated by the arrow designated 13 in FIG. 9, then advancing variable camlobe member 28 would open the intake valve earlier in each cycle and change the proportion of time of each cycle during which the intake valve is maintained in the open position. Retarding variable camlobe member 28 would open the intake valve at the same time, because it still would be opened by fixed camlobe member 36. However, retarding variable camlobe member 28 would keep the intake valve open for a longer duration of time.

To illustrate a further mode of operation of the embodiment shown in FIG. 9, assume that FIG. 3 illustrates one of the splittable cam members shown in FIG. 9 and that the arrow designated 13 indicates the direction of rotation of the shafts as driven by drive pulley 50. Assume that the variable camlobe member designated 28' and shown in phantom in FIG. 3 represents the initial position of the variable camlobe member, which is at a first angular position alpha ($\alpha$) relative to fixed camlobe member 36. In this situation, advancing variable camlobe member until it resides in the position occupied by the phantom camlobe member designated 28" corresponds to movement to an angular position designated beta ($\beta$) relative to fixed camlobe member 36. Such movement does not affect when the valve opens in each cycle, but does shorten the proportion of time during each cycle during which the valve remains open. Similarly, moving the variable camlobe member from the position designated 28" to the position designated 28' such that the angle of the variable camlobe member relative to fixed camlobe member 36 goes from beta to alpha, has the effect of increasing the proportion of each cycle during which the valve is maintained in the open position.

Figure 10:
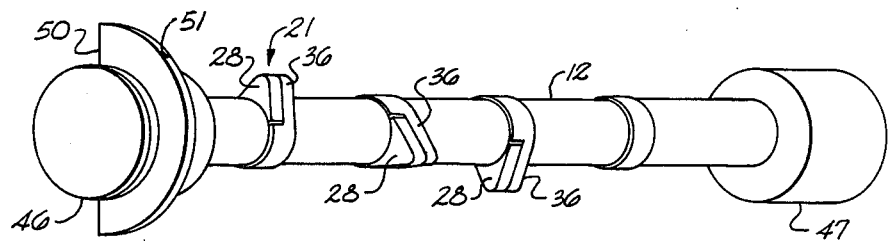
FIG. 10 is a schematic representation of another embodiment of the present invention.

An alternative embodiment of the present invention illustrated in FIG. 10 is suitable for use as one or both of a pair of dual camshafts for a combustion chamber of an internal combustion engine. The FIG. 10 embodiment is the same as the FIG. 9 embodiment except that the fixed cam members 17 have been eliminated and a second variable transmission is contained within a second housing 47 and constitutes part of the control means.

If the second housing 47 with its second variable transmission is eliminated from the embodiment in FIG. 10, then the resulting embodiment is useful as one or both of the camshafts for an internal combustion engine having dual camshafts, one for the intake valves and one for the exhaust valves. If for example the modified FIG. 10 embodiment is used to actuate the intake valves, the rotation of the variable camlobe member relative to the fixed camlobe member causes the dwell, i.e, the duration of the opening of the intake valve, to change.

Figure 7:
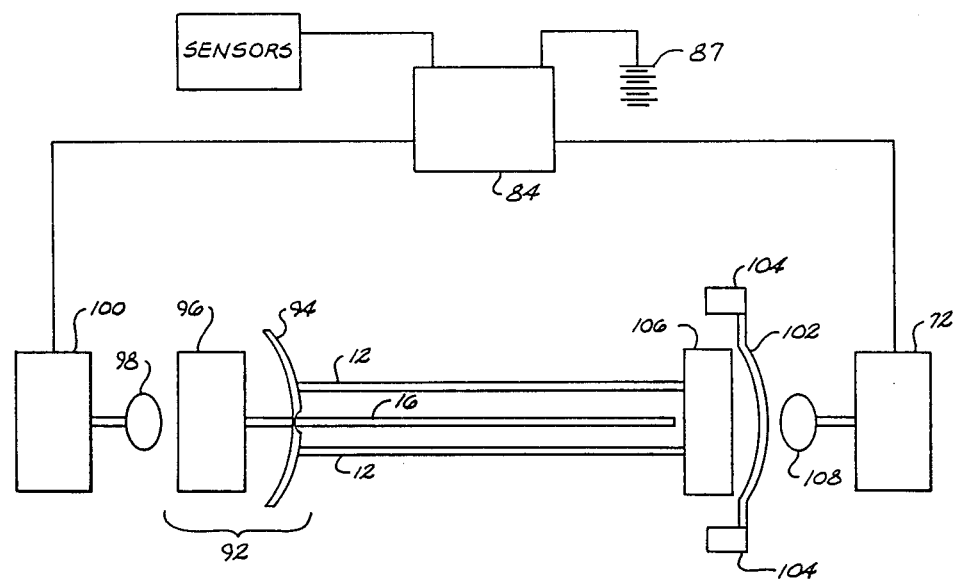
FIG. 7 is a schematic representation of an embodiment of the present invention.
Figure 8:
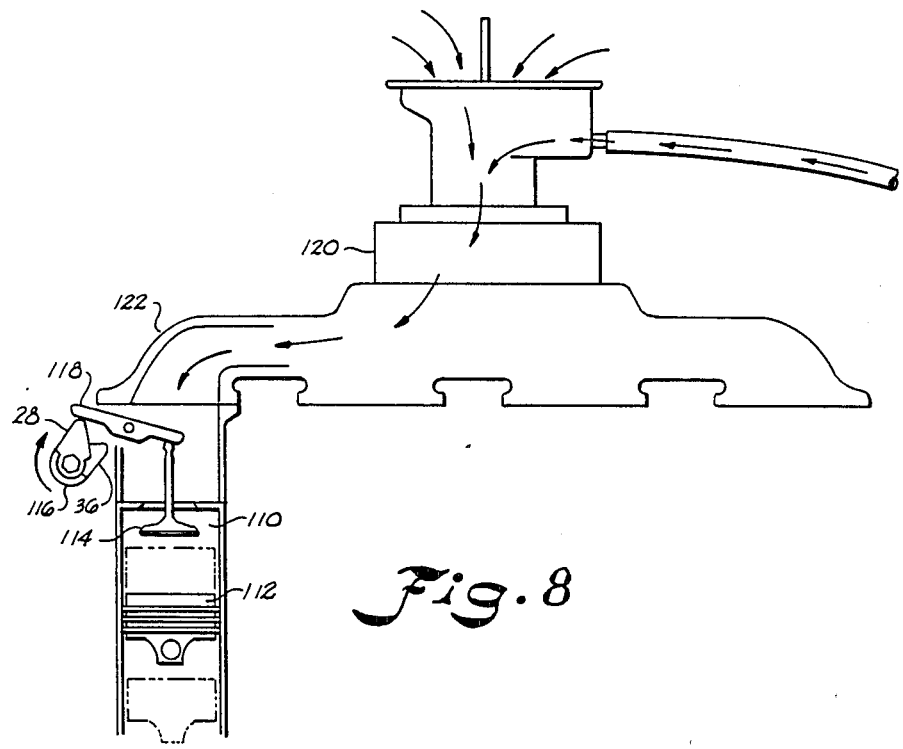
FIG. 8 is a schematic representation of an embodiment of the method of the present invention used with an internal combustion engine.

As illustrated in the embodiment shown in FIG. 7, the first variable transmission of the control means imparts controlled relative rotation between the shafts and the drive means, and the second variable transmission of the control means imparts relative rotation between the shafts. An arbitrarily chosen point of reference 51 is carried by drive pulley 50 to permit gauging of the relative rotation between the drive means and the shafts that is imparted by the first variable transmission of the control means contained within housing 46. This point of reference can be any preselected point on the drive means and is purely hypothetical for purposes of demonstrating whether one or more components of the apparatus rotates in-unison-with or out-of-phase with the drive means. One example of reference point 51 is "engine top dead center." as known in the art, this is the point on the drive pulley where the piston of cylinder No. 1 is at the top of its stroke.

In the embodiment shown in FIG. 10, the variable transmission contained within second housing 47 imparts relative rotation between each variable camlobe member 28 and each fixed camlobe member 36. The variable transmission contained within housing 46 imparts relative rotation between drive pulley 50 and each splittable cam member 21 comprising variable camlobe member 28 and fixed camlobe member 36.

An alternative embodiment of the present invention illustrated in FIG. 11 is suitable for use as a single camshaft for actuating both intake and exhaust valves of an internal combustion engine. For example, the variable cam members could be reponsible for actuating the intake valves, and the fixed cam members could be responsible for actuating the exhaust valves or just the opposite arrangement could be effected. Hollow shaft 12 carries at least one fixed cam member 17. An inner shaft 16 (not shown) carries at least one variable cam member 19 spaced apart from fixed cam member 17 carried on hollow shaft 12. A control means and a linking means, as earlier described, are contained in a housing 46 such that drive pulley 50 is non-rotatably connected to one of the shafts to drive same.

The embodiment of the present invention illustrated in FIG. 11 can be operated as follows. As the drive pulley 50 is driven by an engine, shafts 12 and 16 are driven by drive pulley 50. However, drive pulley 50 is non-rotatably connected to only one of the shafts. Moreover, while the shafts are linked by the linking means, the control means can impart a controlled relative rotation between the shafts while the drive means is driving same. Thus, as hollow shaft 12 is rotated by the drive means, the control means can change the angular relationship between variable cam member 19 and its spaced apart neighboring fixed cam member 17 by imparting a controlled relative rotation between the shaft which carries variable cam member 19 and the shaft which carries fixed cam member 17.

In further accordance with the present invention, a method is provided for attaining a desired engine performance by changing the angular position of the variable cam member relative to the fixed cam member from a first angular position to a second angular position. Variable cam member 19 could be advanced or retarded relative to the direction of rotation imparted by the drive pulley 50. The direction in which the variable cam member 19 moves relative to the direction of rotation of drive pulley 50 can be made dependent at least in part upon at least one desired operating condition of the engine. This can be accomplished by an electronic control unit 84 which can be contained within housing 46. Similarly, electronic control unit 84 can determine the magnitude of the movement of the variable cam member relative to the fixed cam member. This determination can be based at least in part upon at least one desired operating condition of the engine.

An alternative embodiment of the present invention is illustrated in FIG. 12. This embodiment differs from the embodiment illustrated in FIG. 11 by the addition of a second housing 47 which contains a second variable transmission (not shown) of the control means.

As illustrated in the embodiment shown in FIG. 7, the first variable transmission of the control means imparts controlled relative rotation between the shafts and the drive means, and the second variable transmission of the control means imparts relative rotation between the shafts. An arbitrarily chosen point of reference 51 is carried by drive pulley 50 to permit gauging of the relative rotation between the drive means and the shafts that is imparted by the first variable transmission contained within housing 46. In the embodiment shown in FIG. 12, the variable transmission contained within housing 47 imparts relative rotation between variable cam member 19 and fixed cam member 17. Accordingly, the second variable transmission contained within housing 46 imparts relative rotation between drive pulley 50 and the two shafts which carry, respectively, each variable cam member 19 and each fixed cam member 17.

The embodiment illustrated in FIG. 9 can be used to attain a desired engine performance by changing the angular position of the variable camlobe member relative to the fixed camlobe member. Referring to FIG. 3 for example, if the angular position of the variable camlobe member is at a first angular position alpha ($\alpha$) relative to the fixed camlobe member, then this first angular position alpha can be changed to a second angular position beta ($\beta$). This change in angular position can be effected by the control means as explained above.

In changing from the first angular position to the second angular position, the variable camlobe member moves in a predetermined direction relative to the first direction of rotation of the camshaft which embodies the apparatus for actuating and deactuating at least one of the valves. The predetermined direction in which the variable camlobe member moves can be made dependent at least in part upon at least one desired operating condition of the engine. Thus, if a particular operating condition of the engine is desired, a particular input signal can be supplied to the electronic control unit 84. The electronic control unit 84 then would compare the then present operating condition of the engine with the desired operating condition of the engine, and determine whether to move the variable camlobe member in the same direction (advancing) as the direction of rotation of the camshaft or in the opposite direction (retarding) as the direction of rotation of the camshaft. This determination could depend upon other factors, such as whether the particular splittable cam member was actuating an intake valve or an exhaust valve.

The magnitude of the change in angular position of the variable camlobe member can be dependent at least in part upon at least one desired operating condition of the engine. Thus, the control means can move the variable camlobe member over a smaller or larger relative angle with respect to the fixed camlobe member depending upon the then present operating condition of the engine and the desired operating condition. The magnitude of the angular movement determines the duration of the particular valve event being actuated by the particular splittable cam member comprising the variable camlobe member and the fixed camlobe member.

As shown in FIGS. 9 and 10, a drive pulley 50 is schematically represented. Drive pulley 50 comprises the drive means of the apparatus for actuating and deactivating at least one of the valves. Furthermore, a second variable transmission of the control means is schematically represented in FIGS. 10 and 12 as being housed within a second housing 47. In the embodiment illustrated in FIG. 10, one of the variable tranmissions used to control relative movement between the variable camlobe member and fixed camlobe member of each splittable cam member along the shaft, while the other variable transmission is used to control relative movement between both camlobe members, variable and fixed, and the drive means. In the embodiment illustrated in FIG. 12, one of the variable transmissions of the control means controls relative movement between the variable cam member and the fixed cam member, while the other variable transmission is used to control relative movement between both cam members, variable and fixed, and the drive means.

All embodiments with splittable cam members allow for changing the magnitude of a valve's dwell angle. The dwell angle can be defined as the angular portion of a 360° camshaft rotational cycle during which the valve is held open. The valve opening and closing sequence can be defined also in angular terms as angular positions occuring during this rotational cycle. These angular positions are determined relative to some arbitrary but constant rotational reference point such as engine top dead center. Adjusting the variable camlobe member changes the opening and/or closing angle and allows the magnitude of the valve's dwell angle to be changed. When this member is adjusted in the embodiments of FIGS. 1, 2, and 9, either the valve opening or closing angle is changed. The fixed camlobe member keeps the other of these angles the same.

Figure 2:
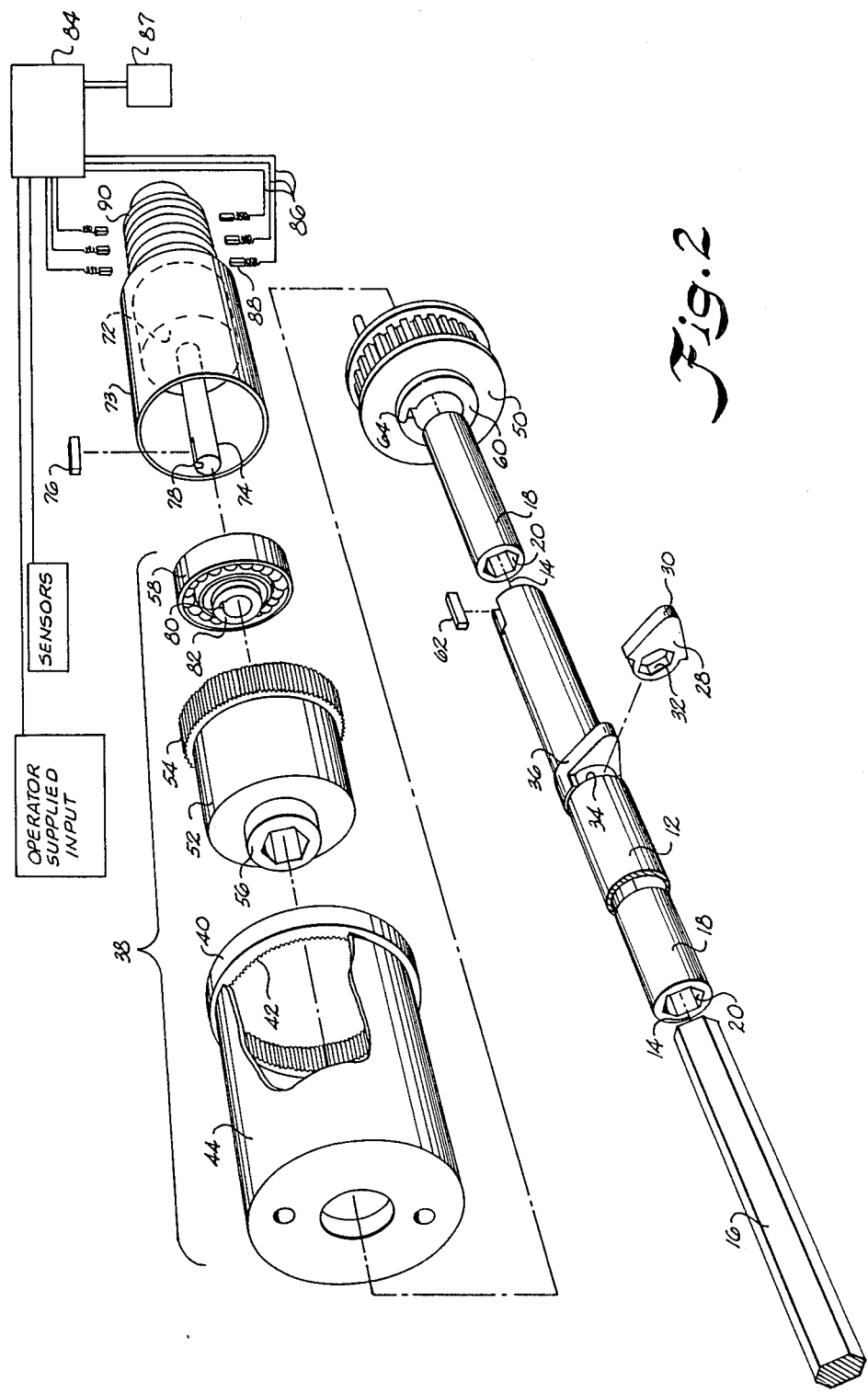
FIG. 2 is an exploded perspective view of the embodiment of FIG. 1.

The embodiments shown in FIGS. 1 and 2 can be used as one or both of the camshafts used within engines having dual camshaft arrangements. The dwell angle of each valve actuated can be varied using splittable cam members. If for example the embodiment of FIGS. 1 and 2 is used as the intake camshaft on an engine having dual camshafts, then variable overlap angles can be achieved by using the variable camlobe members to change the intake valve opening angle. In this case the closing angle remains unchanged. This approach eliminates one of the compromising effects associated with the conventional camshaft phasing approaches. If in the same engine the opening angle is held fixed and the closing angle is changed, the embodiment can be used to eliminate the pumping losses associated with throttled operation in spark ignition engines. Changing the intake valve's closing angle while keeping the opening angle the same also serves to vary an engine's compression ratio. This can be useful with diesel engines to improve cold starting and optimize brake specific fuel consumption. The embodiments could also reduce turbo-lag on turbo-charged engines. To accomplish this, the exhaust valve is opened earlier to permit higher temperature and pressure gases to flow into the turbine. The applicants believe that the embodiments can also be used for exhaust gas recirculation control to lower emissions levels and for scavenging engines.

The embodiment shown in FIG. 9 with the splittable cam member can be used in engines having only one camshaft in the same way the embodiments shown in FIGS. 1 and 2 are used in engines having two separate camshafts, one for intake valve and another for exhaust valve. If for example the intake cam is the splittable cam member, variable-overlap angles can be achieved by changing the intake valve's opening angle with the variable camlobe member. Thus, the splittable cam member's dwell is varied while the other cam member's timing events remain unchanged. This embodiment allows variable overlap angles to be achieved by varying the intake valve opening time. It differs from the conventional camshaft phasing approaches since using the embodiment of the present invention permits the intake-valve closing angle and the sequence of all exhaust-valve events to remain unchanged. In other words, the dwell of an intake or exhaust valve can be changed with the splittable cam member without changing the sequence of the other valve's events.

The splittable cam member embodiment shown in FIG. 10 can be used as one or both of the camshafts in engines with dual camshaft arrangements. This embodiment can be used in the same way the embodiments shown in FIGS. 1 and 2 are used. However, this embodiment allows the added flexibility of changing both the valve's opening and closing angles. The two variable transmissions of the control means render both the variable camlobe member and the fixed camlobe member adjustable relative to the drive means. Thus, the valve opening and closing angles can be varied independently and the sequence of valve events can be optimized for any operating conditions. This allows optimization of engine parameters affecting emissions, economy, and performance on both spark ignition and compression ignition engines.

Thus, in the FIG. 10 embodiment, the dwell angle can be changed by changing either the valve opening or closing angle of an intake or exhaust valve actuated by a splittable cam member. Furthermore, the valve opening angle can be varied independently of the valve closing angle and vice-versa.

The embodiment shown in FIG. 11 is for use in engines having only one camshaft. Either an intake cam member or an exhaust cam member is phase shifted. Thus, the dwell angle of the valve actuated by this cam member remains constant, and phase shifting the cam member changes the opening and closing angles by the same amount. In this embodiment, an intake or exhaust cam member actuating its respective valve can be phase shifted without affecting the opening and closing angles of the other valve. This embodiment can be used to achieve variable overlap angles on engines with single camshaft arrangements.

The embodiment shown in FIG. 12 is for use in engines having only one camshaft. Both the variable cam member and the fixed cam member can be moved relative to one another and relative to the drive means. Thus, the dwell angle for each of the cam members remains constant and phase shifting the variable cam member changes the opening and closing angles of the valve it actuates. This embodiment allows for separate phasing adjustments for both the intake and exhaust valves in a single camshaft engine. By varying the intake or exhaust valve's opening and closing angles, this embodiment can be used to achieve variable-overlap angles.

In accordance with the present invention, a method is provided for reducing pumping losses and improving brake specific fuel consumption for an internal combustion engine. The engine has a combustion chamber with a piston therein for varying the volume of the combustion chamber. An induction manifold is disposed between the atmosphere and the combustion chamber. An intake valve is disposed between the combustion chamber and the induction manifold. A camshaft for actuating the intake valve comprises a further component of the internal combustion engine.

The method of the present invention comprises inducting a charge of fluid into the combustion chamber. As embodied herein and shown schematically in FIG. 8, a charge of fluid is inducted into a combustion chamber 110 as a piston 112 therein moves towards bottom dead center in its stroke (indicated in phantom). In a diesel engine, the charge of fluid comprises only air, while fuel and air comprise the charge of fluid in a spark-ignition engine.

In further accordance with the present invention, the intake valve is held open during a portion of the compression stroke of the piston. As embodied herein and shown for example in FIG. 8, the step of holding an intake valve 114 open can be accomplished by adjusting the splittable cam member of a camshaft 116 formed in accordance with the apparatus for actuating an actuation member of the present invention. In the embodiment of the apparatus of the present invention depicted in FIGS. 1-6, the variable camlobe member can be rotated relative to the fixed camlobe member in a direction opposite to the direction of rotation of the camshaft formed by shafts 12, 16. This relative adjustment of the camlobe members serves to extend the portion of the rotational cycle of the camshaft during which the splittable cam member is actuating a cam follower, such as a rocker arm 118, which is connected to intake valve 114, as shown in FIG. 6.

In further accordance with the present invention, a portion of the inducted charge is expelled from the combustion chamber. As embodied herein, the expulsion of a portion of the inducted charge is accomplished by the step of holding the intake valve open during a portion of the compression stroke of the piston. Since the intake valve is held open, the initial portion of the compression stroke forces a portion of the inducted charge from the combustion chamber out through the intake valve. The amount of charge expelled can be controlled by the time the valve is held open during the stroke. This time depends on the angular displacement effected between the fixed and variable camlobe members.

In yet further accordance with the present invention, the expelled portion of the inducted charge is prevented from communicating with the atmosphere. As embodied herein and shown for example in FIG. 8, the expelled portion of the inducted charge is prevented from communicating with the atmosphere by the provision of a check valve 120. The check valve is disposed between an induction manifold 122 and the atmosphere and permits flow only in the direction from the atmosphere into the induction manifold. Preferably, a reed valve is provided as the check valve in the preferred embodiment of the present invention.

In a spark ignition engine, preventing the expelled air and fuel charge from communicating with the atmosphere, conserves fuel in addition to providing a supercharging effect.

In further accordance with the present invention, the intake valve is closed during the remainder of the compression stroke and after the portion of the inducted charge is expelled. As embodied herein and again referring to FIG. 8, as the variable camlobe member ceases to contact valve rocker arm 118 of the intake valve, the intake valve closes under the influence of a biasing device (not shown), and the remainder of the compression stroke of the piston (shown in phantom) ceases to expel any of the inducted charge from the combustion chamber.

The brake specific fuel consumption defines an engine operating parameter that measures the mass rate of flow of fuel into an engine per unit of horsepower produced by the engine. It is contemplated that the method and apparatus of the present invention can provide improvements in brake specific fuel consumption. These improvements should be greatest at low speeds and light loads because under these conditions the pumping losses associated with throttled operation are the highest for a conventional camshaft arrangement.

Diesel engines require high compression ratios to facilitate their cold starting capability. However, optimum brake specific fuel consumption requires somewhat lower compression ratios than required for cold starting. The apparatus and method of the present invention facilitate closing the intake valves later in the compression stroke of the piston to allow the initiation of the compression process to be delayed. The effect of maintaining the valves in the open position longer is to shorten the effective compression stroke and thereby reduce the compression ratio. Thus, the apparatus and method of the present invention permit compression ratios to be optimized to provide a high compression ratio for cold starting a diesel engine and a lower compression ratio for better fuel economy of the diesel engine after it warms up. The invention also provides for control of the engine's variable compression ratio for any desirable operating condition.

The present invention permits variation in the intake valve opening and closing times of an internal combustion engine to optimize that engine's performance for all engine speeds and loads. The apparatus and method of the present invention also are applicable to control the scheduling of exhaust valve timing events of an internal combustion engine.

It will be apparent to those skilled in the art that various modifications and variations can be made in the apparatus and method of the present invention without departing from the scope or spirit of the invention. For example, the invention can be applied to achieve the advantages afforded by variable valve timing described above. Thus, it is intended that the present invention cover the modifications and variation of this invention provided they come within the scope of the appended claims and their equivalents.

What is claimed is:

1. In an internal combustion engine having an intake valve, an exhaust valve, valve events consisting of opening timing and closing timing of a valve and a single camshaft rotatable in a first direction and with an intake cam member and an exhaust cam member, one of said cam members being a splittable cam member comprising a first camlobe member and a second camlobe member wherein the angular positions of said first camlobe member is variable relative to said second camlobe member and is at a first angular position relative to same, the other cam member being at a fixed angular position relative to said camshaft and said second camlobe member, an electronic control unit controlling the angular position between said camlobe members depending upon at least one of the engine operating parameters and desired engine operating conditions, a method of attaining a desired engine performance, comprising the steps of:

changing the relative angular position of said camlobe members from said first angular position to a second angular position so as to optimize one of the valve events of the valve being actuated by said splittable cam member without changing the other valve event of the same valve and doing so at at least two combinations of speed and load at which the engine is operating.

2. The method of claim 1, wherein:

in changing from said first angular position to said second angular position, one of said camlobe member moves in a predetermined direction relative to the direction of rotation of the camshaft, said predetermined direction and the magnitude of the angular movement of the camlobe member in moving from the first angular position to said second angular position being dependent at least in part upon at least one desired operating condition of the engine.

3. In an internal combustion engine having a valve, valve events consisting of opening timing and closing timing of a valve and a camshaft rotatably driven in a first direction by a drive pulley connected thereto, said drive pulley carrying a predetermined reference point, said camshaft carrying a splittable cam member, the splittable cam member comprising a fixed camlobe member and a variable camlobe member, said fixed camlobe member being non-rotatable relative to a portion of said camshaft carrying said fixed camlobe member and wherein the angular position of said variable camlobe member is variable relative to said fixed camlobe member under the control of an electronic control unit programmed to change the angular position to optimize one of the valve events depending upon at least one of the engine operating conditions, the variable camlobe member being at a first angular position relative to said fixed camlobe member, and wherein the angular position of said fixed camlobe member relative to said reference point of said drive pulley is at a first reference angular position and is variable under the control of an electronic control unit programmed to change the reference angular position to optimize the other of the valve events depending upon at least one of the engine operating conditions, a method of attaining a desired engine performance comprising the steps of:

optimizing one of the valve events of the valve actuated by the splittable cam member at at least two combinations of load and speed at which the engine is operating, by changing the angular position of the variable camlobe member relative to the fixed camlobe member from said first angular position to a second angular position without changing the other valve event of the valve actuated by the splittable cam member.

4. The method of claim 3, wherein:

in changing from said first angular position to said second angular position, said variable camlobe member moves in a predetermined direction relative to the first direction of rotation of the camshaft, said predetermined direction and the magnitude of the angular movement of the variable camlobe member in moving from the first angular position to said second angular position being dependent upon at least one desired operating condition of the engine.

5. The method of claim 3, further comprising the step of:

optimizing the other of the valve events of the valve actuated by the splittable cam member notwithstanding what combination of load and speed at which the engine is operating, by changing the reference angular position of the fixed camlobe member relative to the reference point of said drive pulley from said first reference angular position to a second reference angular position without changing the position of the variable camlobe member relative to said reference point of said drive pulley.

6. The method of claim 5, wherein:

in changing from the first relative angular position to said second relative angular position, said fixed camlobe member moves in a predetermined direction relative to the first direction of rotation of the camshaft, said predetermined direction and the magnitude of the angular movement of the fixed camlobe member in moving from the first relative angular position to said second relative angular position being dependent upon at least one desired operating condition of the engine.

7. In an internal combustion engine having an intake valve, an exhaust valve, valve events consisting of opening timing and closing timing of a valve and a camshaft rotatable in a first direction and carrying an intake cam member and an exhaust cam member, one of said cam members being a variable cam member and the other of said cam members being a fixed cam member, said fixed cam member being at a fixed angular position relative to a portion of said camshaft, said variable cam member being at a first angular position relative to said fixed cam member and being variable to change the angular position of said variable cam member relative to said fixed cam member, an electronic control unit controlling said angular position so as to optimize the timing of one of the valve events for the entire range of engine speeds and loads, a method of attaining a desired engine performance comprising the steps of:

changing the angular position of the variable cam member relative to the fixed cam member from said first angular position to a second angular position so that the timing of said valve event is optimized at at least two combinations of speed and load at which the engine is operating.

8. The method of claim 7, wherein:

in changing from said first angular position to said second angular position, said variable cam member moves in a predetermined direction relative to the first direction of rotation of the camshaft, said predetermined direction and the magnitude of the angular movement of the variable cam member in moving from the first angular position to the second angular position being dependent at least in part upon at least one desired operating condition of the engine.

9. In an internal combustion engine having an intake valve, an exhaust valve, valve events consisting of opening timing and closing timing of a valve and a camshaft rotatably driven in a first direction by a drive pulley connected thereto, said drive pulley carrying a predetermined reference point, said camshaft carrying an intake cam member and an exhaust cam member, one of said cam members being a fixed cam member and the other of said cam members being a variable cam member, said fixed cam member being at a fixed angular position relative to a portion of said camshaft carrying said fixed cam member, and wherein the angular position of said variable cam member is variable relative to said fixed cam member and is at a first angular position relative to said fixed cam member, and wherein the angular position of said fixed cam member relative to said reference point of said drive pulley is variable and at a first reference angular position, and an electronic control unit controlling variation of both said angular position and said reference angular position so as to optimize the timing of one of the valve events of at least one valve over the entire range of engine speeds and loads, a method of attaining a desired engine performance comprising the steps of:

optimizing one of the valve events of the valve actuated by the variable cam member at at least two combinations of speed and load at which the engine is operating, by changing the angular position of the variable cam member relative to the fixed cam member from said first angular position to a second angular position without changing either of the valve events of the valve actuated by the fixed cam member.

10. The method of claim 9, wherein:

in changing from said first angular position to said second angular position, said variable cam member moves in a predetermined direction relative to the first direction of rotation of the camshaft, said predetermined direction and the magnitude of the angular movement of the variable cam member in moving from the first angular position to said second angular position being dependent upon at least one desired operating condition of the engine.

11. The method of claim 9, further comprising the step of:

optimizing one of the valve events of the valve actuated by the fixed cam member notwithstanding what combination of speed and load at which the engine is operating, by changing the angular position of the fixed cam member relative to the reference point of said drive pulley from said first reference angular position to a second reference angular position without changing either of the valve events of the valve actuated by the variable cam member.

12. The method of claim 11, wherein:
in changing from the first relative angular position to said second relative angular position, said fixed cam member moves in a predetermined direction relative to the direction of rotation of the camshaft, said predetermined direction and the magnitude of the angular movement of the fixed cam member in moving from the first relative angular position to said second relative angular position being dependent upon at least one desired operating condition of the engine.

* * * * *